United States Patent [19]

Ugajin et al.

[11] Patent Number: 5,046,039

[45] Date of Patent: Sep. 3, 1991

[54] BUFFER MANAGEMENT SYSTEM

[75] Inventors: Atsushi Ugajin; Hisashi Matsumura; Tokuhiro Niwa, all of Hadano, Japan

[73] Assignee: Hitachi, Ltd., Tokyo, Japan

[21] Appl. No.: 196,540

[22] Filed: May 20, 1988

[30] Foreign Application Priority Data

May 25, 1987 [JP] Japan ................................ 62-125773

[51] Int. Cl.[5] ................................................ G05B 23/02

[52] U.S. Cl. .................................. 364/900; 364/926.1; 364/949.4; 364/939

[58] Field of Search ... 364/200 MS File, 900 MS File; 370/84; 340/825.15

[56] References Cited

U.S. PATENT DOCUMENTS 4,403,286 9/1983 Fry et al. ............................ 364/200

4,603,382 7/1986 Cole et al. ............................ 364/200

4,845,710 7/1989 Nakamura et al. .............. 370/110.1

*Primary Examiner*—Stuart N. Hecker

*Assistant Examiner*—Rebecca L. Rudolph

*Attorney, Agent, or Firm*—Pennie & Edmonds

[57] ABSTRACT

In a buffer management system for communication apparatus, the statistical information to be collected at each station such as the number of occurences of receiver buffer busy state is counted at regular time intervals for a preset time duration, and if it becomes in excess of a predetermined number, the ratio in size of transmitter buffer area to receiver buffer area is changed in accordance with the buffer busy state number such that the size of the receiver buffer area becomes larger.

14 Claims, 5 Drawing Sheets

BUFFER MANAGEMENT SYSTEM

BACKGROUND OF THE INVENTION

The present invention relates to a buffer management system for communication apparatus applicable to, for example, OSI 7 layer models in a token ring Local Area Network (LAN). Specifically, it concerns a buffer management system capable of preventing communication performance from being degraded upon occurrence of buffer busy state at communication apparatus having different traffic, by changing the ratio of transmitter buffer capacity to receiver buffer capacity in the associated communication apparatus.

In a conventional communication system, there is a known method, for example, disclosed in JP-A-60-171849 that when a utilization factor of a transmitter/-receiver buffer becomes a predetermined base value a data transfer speed change signal is sent to a modem from a data traffic control unit to reduce the data traffic by several multiples.

According to the above conventional technique, even though the data traffic is not reduced to zero even if the utilization factor exceeds the predetermined base value, a problem is that the communication performance is degraded due to the control of the data transfer speed.

SUMMARY OF THE INVENTION

The present invention seeks to eliminate the above prior art problems of data communication apparatus of this type and allow data communication such that even when the utilization factor of a receiver buffer becomes a certain value (busy state), the data traffic is not limited but instead the data communication can be continued by selecting an optimum ratio of transmitter buffer capacity to receiver buffer capacity with minimized degradation of the communication performance.

To achieve the above object, the present invention provides a buffer management system for communication apparatus wherein statistical information such as the number of occurrences of receiver buffer busy state collected at each station is checked at regular intervals. When the number of busy states exceeds a predetermined value, the ratio of transmitter buffer area to receiver buffer area is changed in accordance with the number of occurrences of a busy state at the receiver buffer, such that the size of the receiver buffer area becomes larger. This ratio change decreases the number of occurrences of a busy state at the receiver buffer without reducing the data traffic.

More specifically, a communication apparatus at each station has a RAM with a plurality of transmitter and receiver buffers consecutively disposed in the memory area. Data loaded in the transmitter buffer area are transmitted over the communication line, whereas data from the communication line are loaded in the receiver buffer area. A "busy state" is herein defined as the state when the number of empty receiver buffers becomes smaller than a predetermined number. The number of occurrences of a busy state (receiver buffer busy state number) is counted. A receiver/transmitter buffer ratio correspondence table is then referred to. The table exists in RAM and contains receiver buffer busy state numbers counted during a preset time duration as its parameter to determine receiver buffer lengths. A dynamic control means then changes the ratio of transmitter buffer area to receiver buffer area in accordance with the receiver buffer busy state number such that the size of the receiver buffer area becomes larger. Since the overall size (capacity) of the transmitter buffer area and the receiver buffer area is always constant, the transmitter buffer area becomes smaller as the receiver buffer area becomes larger. In other words, the border between the transmitter and receiver buffer areas is caused to move successively as the receiver buffer busy state number changes. Assuming that the buffer length is a multiplication of a unit buffer capacity by the number of buffers, the above dynamic control may be conducted by stepwise changing the number of buffers in accordance with the receiver buffer busy state number.

In a preferred embodiment of this invention, the dynamic control means is initiated by an interruption timer which issues interrupts to the communication apparatus at regular intervals. In response, the dynamic control means reads the receiver buffer busy state number from a RAM, and determines the receiver/transmitter buffer ratio corresponding to the read-out receiver buffer busy state number based on the correspondence table.

With the above technique, as the receiver buffer busy state number counted during a preset time duration becomes larger than a predetermined number, the dynamic control means changes the transmitter/receiver buffer ratio in accordance with the counted number such that the size of the receiver buffer area becomes large. Consequently, with a constant capacity of the transmitter/receiver buffer, the reception buffer busy state can be shortened or the receiver buffer busy state number can be reduced, without reducing the data traffic from the sending party, thus ensuring optimum date transfer without degrading the communication performance.

Since the entire capacity of the transmitter/receiver buffer is constant, the transmitter buffer area becomes smaller as the receiver buffer area becomes larger. In this connection, the slight blockade of the transmission data brought by the decrease in area of transmitter buffer does not give rise to a trouble because the transmission data traffic can be controlled as desired at the apparatus concerned.

Re-initializing the transmitter/receiver buffer ratio is carried out at the time of software reset, with software executing the sequence after the hardware initializing and the software pad parameter setting. Therefore, the communication is temporarily stopped. However, this period is shorter than the logical link cut-off monitor time so that logical links associated with the station now concerned will not be cut off. Further, the number of maximum allowable receiver buffers is limited on the transmitter/receiver buffer ratio correspondence table which prevents the entire transmitter/receiver buffer capacity will not be assigned to the receiver buffer which would disable data transmission from the station now concerned. Furthermore, the transmitter/receiver buffer ratio reverts to an original one if no receiver buffer busy state occurs during a preset time duration, so that the limited area for the receiver buffer area is released.

DESCRIPTION OF THE PREFERRED EMBODIMENT

Figure 1:
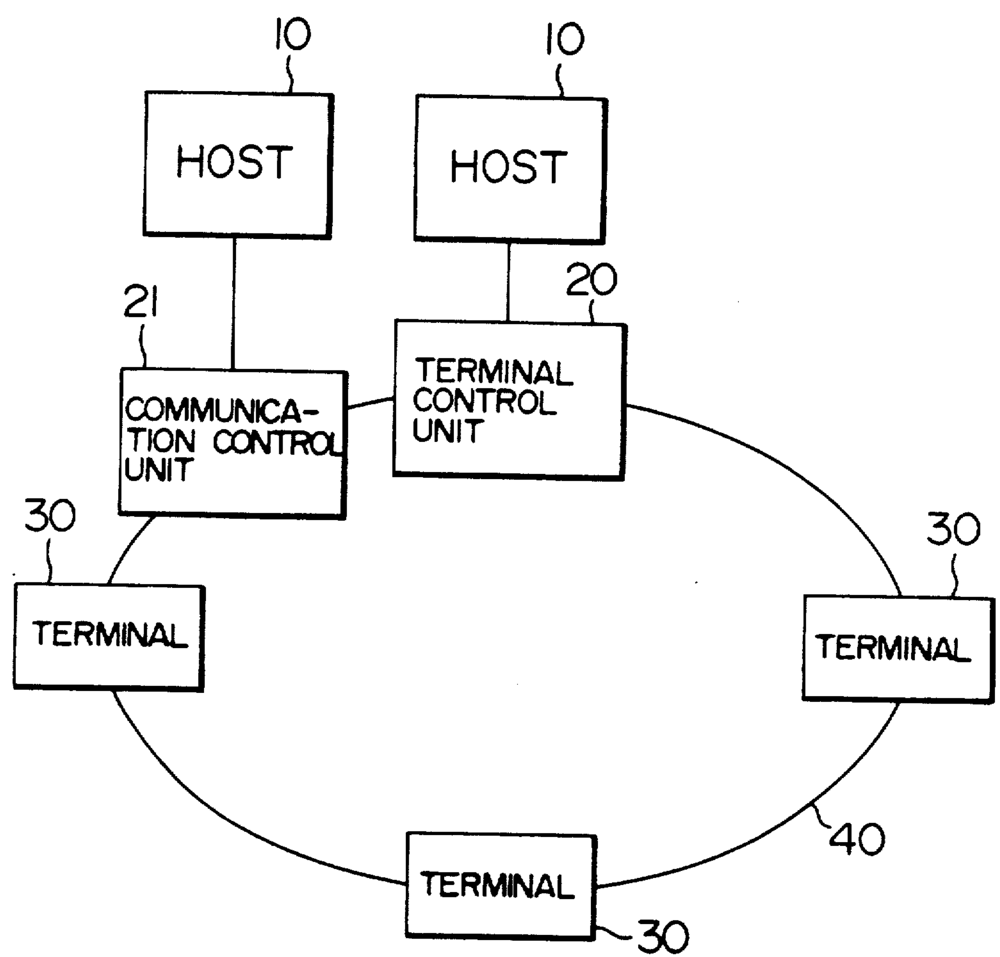
FIG. 1 is a schematic diagram showing an embodiment of a communication system embodying the present invention.

The embodiment of the present invention is shown in FIG. 1 which shows the structure of a communication system.

In FIG. 1, reference numeral 10 represents a host computer, 20 a terminal control unit for controlling the communication between terminals and host computers, 21 a communication control unit, 30 a terminal which communicates with host computers or the other terminals, and 40 a communication line connecting a plurality of terminals and terminal control units.

Figure 2:
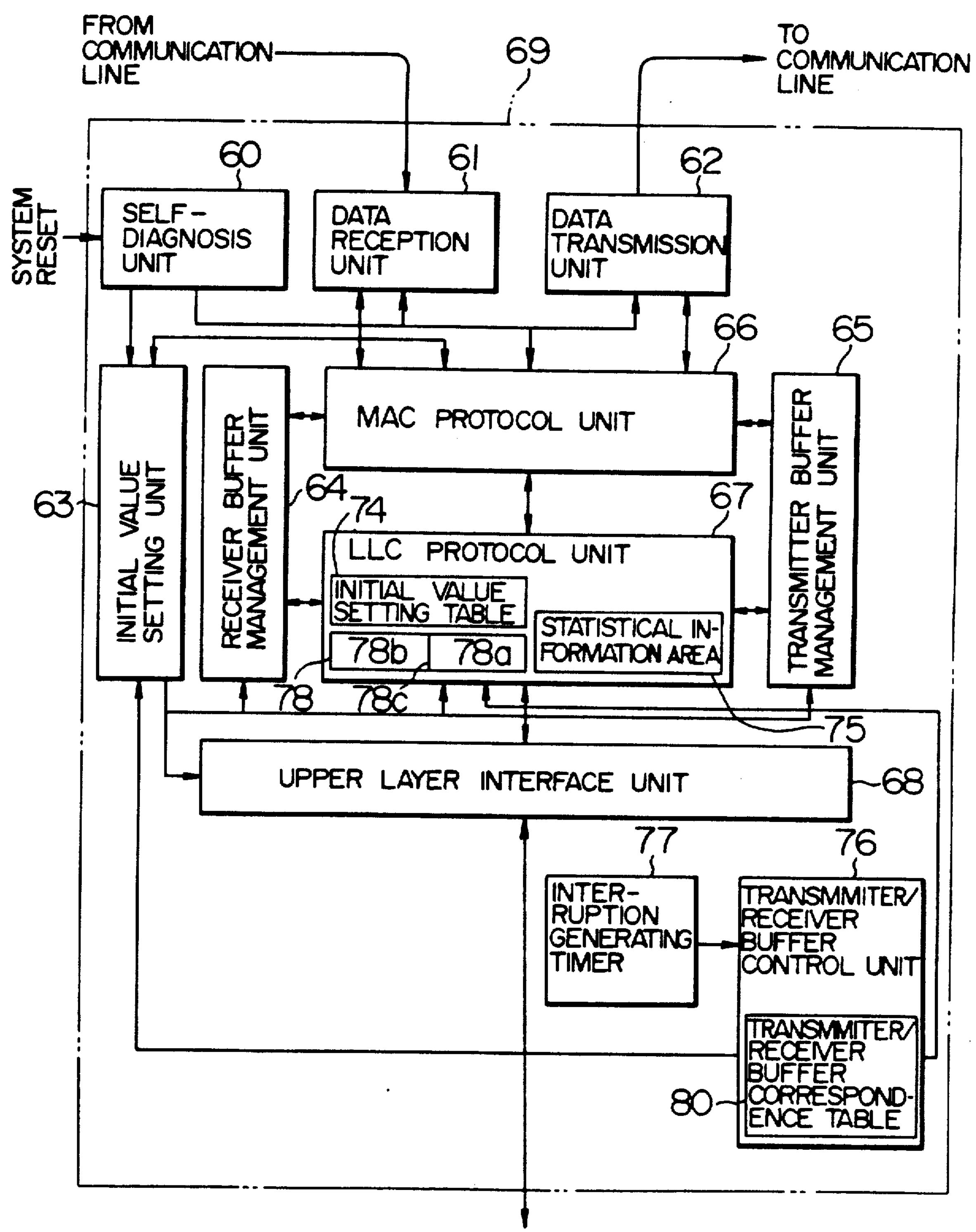
FIG. 2 is a block diagram of a LAN board controlling the LLC and lower layers, the LAN board being mounted on each terminal and each terminal control unit shown in FIG. 1.

FIG. 2 is a block diagram of a communication control adaptor 69 mounted on the terminal control unit 20 and the terminal 30 to perform data transfer control and flow control. A self-diagnosis unit 60 conducts a memory read/write test, a register read/write test and an instruction execution test (these are collectively referred to as "self-diagnosis") at the time of system reset when the hardware of the communication control adaptor is initialized. A data reception unit 61 receives data from the communication line, whereas a data transmission unit 62 transmits data to the communication line. An initial value setting unit 63 conducts a hardware initial value setting and an initial value setting of a transmitter/receiver buffer ratio under control of a transmitter/receiver buffer dynamic control unit 76, at the time of software reset by which the initial value of the communication adaptor 69 is instructed from the external to be set in the adaptor. A receiver buffer management unit 64 manages the receiver buffer area on a RAM set by initialization, whereas transmitter buffer management unit 65 manages the transmitter buffer area on the RAM set by initialization. A MAC (Medium Access Control) protocol control unit 66 executes a protocol which controls and gives an access to the communication line. As a protocol control unit for performing data transfer control and flow control, there are known an LLC (Logical Link Control) protocol control unit and an HDLC (High Level Data Link Control) protocol control unit. In the following description, the LLC protocol control unit 67 is assumed to be used in the embodiment shown in FIG. 2. An upper layer interface unit 68 controls the interface between the network and upper layers in an OSI (Open Systems Interconnection). A statistical information area 75 included in the LLC protocol control unit 67 counts the receiver buffer busy state number. In response to an interruption from a timer interruption generator timer 77, a transmitter/receiver buffer dynamic control unit 76 reads and checks the statistical information at regular intervals against a transmitter/receiver buffer ratio correspondence table 80 included in the transmitter/receiver buffer dynamic control unit, to thereby control the transmitter/reception buffer ratio. A transmitter/receiver buffer 78 is formed in a RAM of the LLC protocol control unit and has a transmission buffer area 78*a* and a receiver buffer area 78*b* the border 78*c* of which is caused to move in the manner to be described later.

Figure 3:
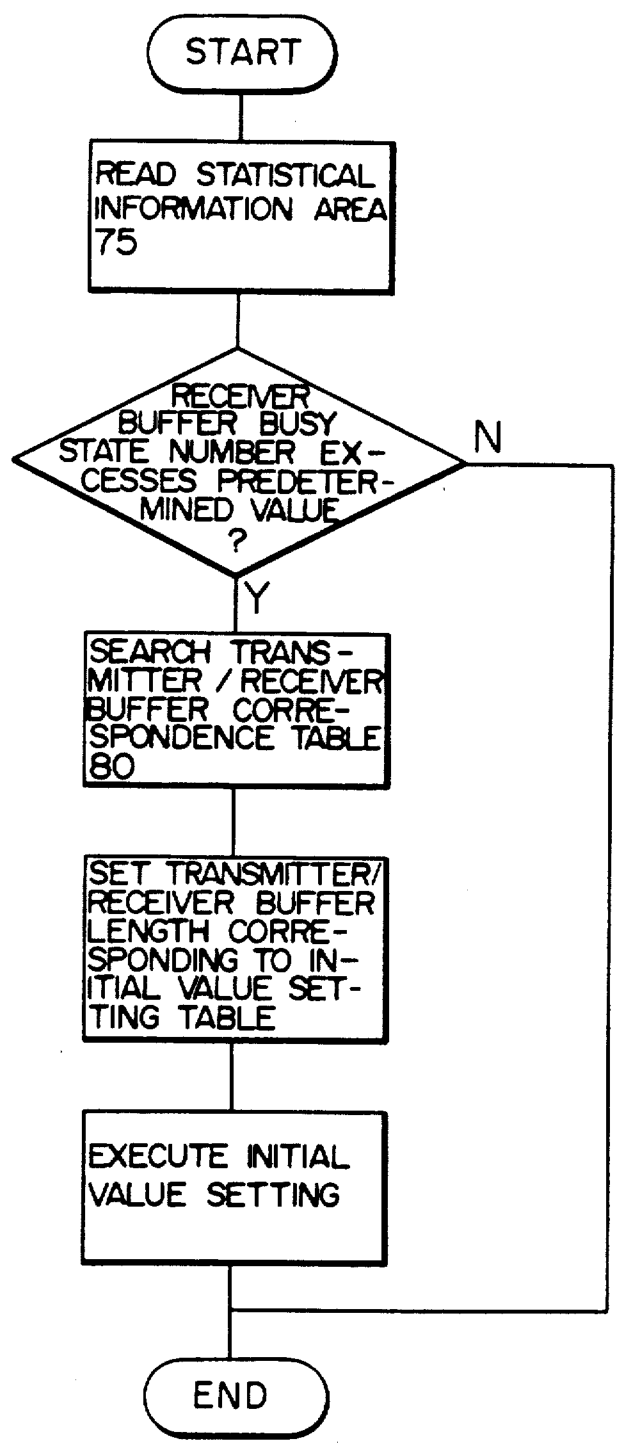
FIG. 3 is a flow chart illustrating the sequence after a software reset.

FIG. 3 is a flow chart illustrating the processes performed by the transmitter/receiver buffer dynamic control unit 76 of the communication control adaptor 69 mounted on the terminal control unit 20, communication control unit 21 and terminal 30 shown in FIG. 1. The statistical information area 75 is read at regular time periods. If the read-out receiver buffer busy state number exceeds a predetermined value, the transmitter/receiver buffer ratio correspondence table 80 is searched to perform re-initialization by using a proper transmitter/receiver buffer length.

Figure 4:
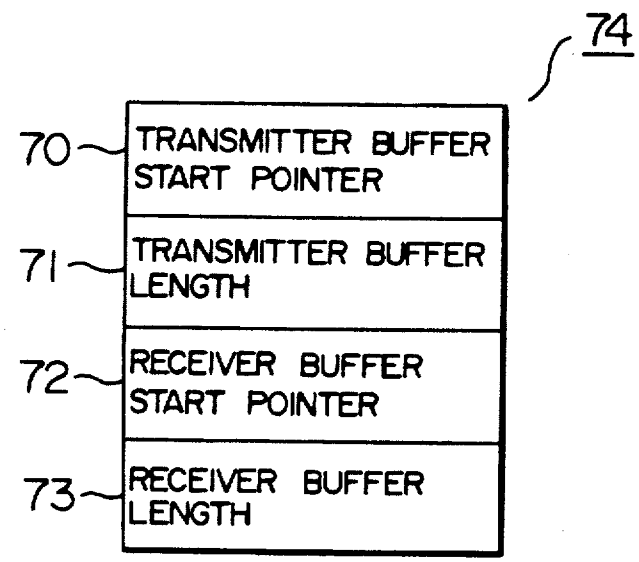
FIG. 4 shows the structure of an initial value setting table.

FIG. 4 shows the structure of the initial value setting table 74 included in the LLC protocol control unit 67. The LLC layer determines the transmitter/receiver buffer ratio in accordance with the table. Reference numeral 70 represents a transmitter buffer start pointer indicating the start position of the transmitter buffer area, 71 a transmitter buffer length indicating the size of the transmitter buffer area, 72 a receiver buffer start pointer indicating the start position of the receiver buffer area, 73 a receiver buffer length indicating the size of the receiver buffer area, and 74 the initial value setting table including those 70 to 73.

Figure 5:
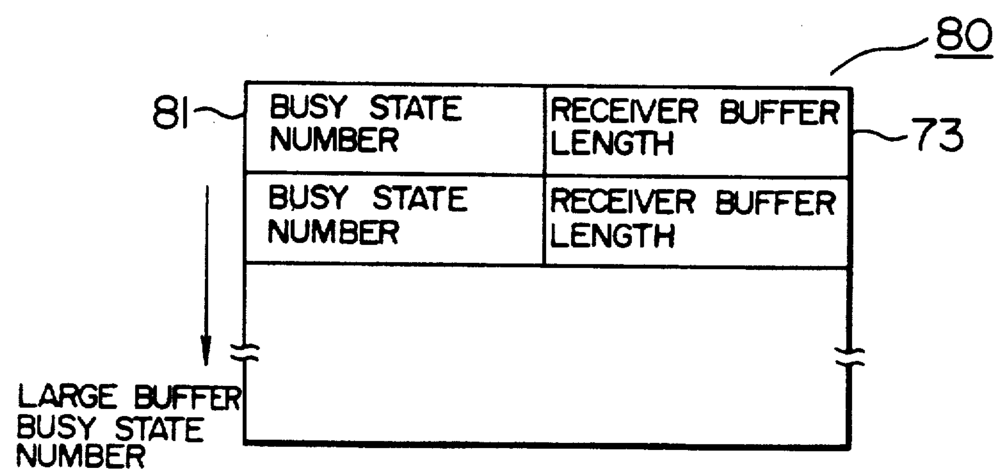
FIG. 5 shows the structure of a traffic buffer ratio correspondence table.

FIG. 5 shows the structure of the transmit/receive buffer ratio correspondence table 80 by which it becomes possible to dynamically change the transmit/receive buffer ratio, corresponding to the traffic measured by the busy state number.

Figure 6:
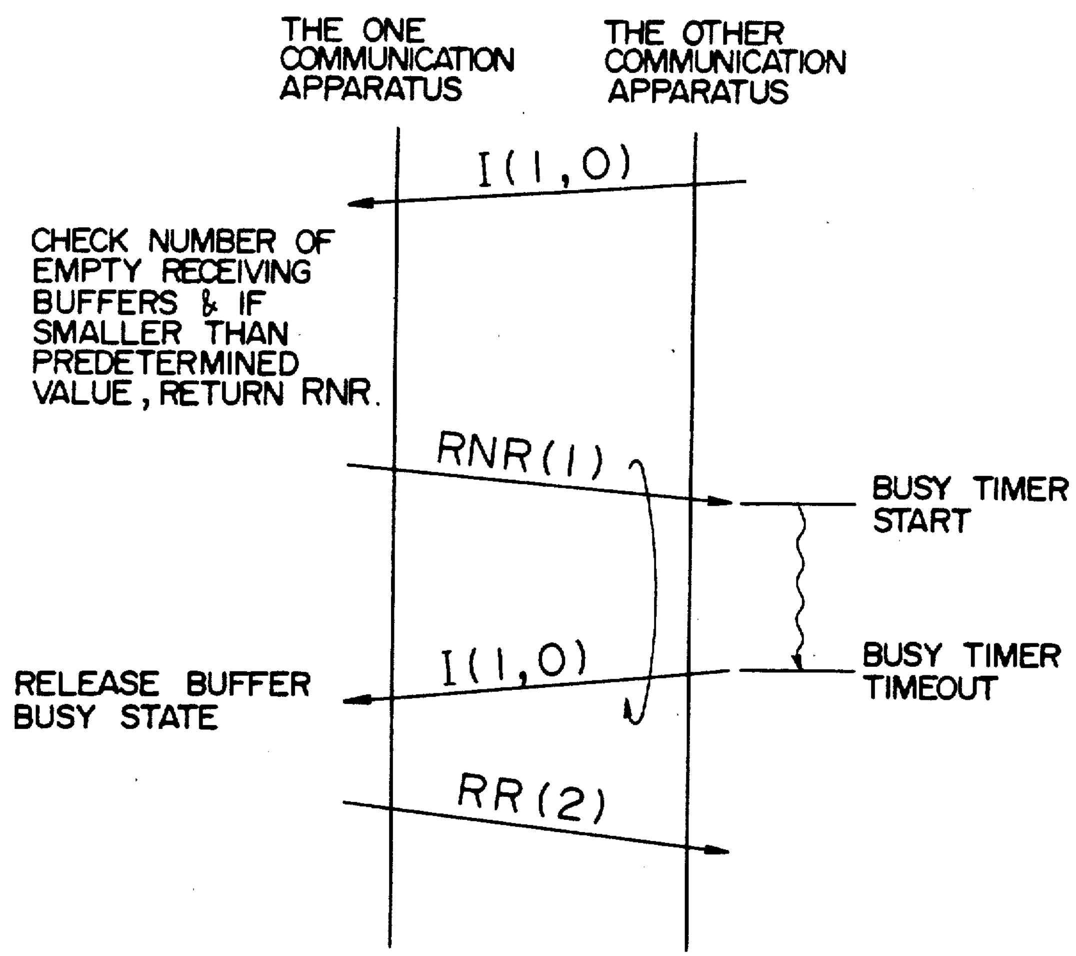
FIG. 6 illustrates the operation between communication apparatus during receiver buffer busy state.

FIG. 6 illustrates the operation between communication apparatus during the receiver buffer busy state. In FIG. 6, I represents data information, RR represents a Receive Ready (communication enabled) signal, and RNR represents a Receive Not Ready (or busy) signal. Upon reception of data information I(1, 0) from a sending communication apparatus, the receiving communication apparatus checks the number of empty receiver buffers, and if it is smaller than a predetermined value, an RNR (busy) signal is sent to the sending communication apparatus. Upon reception of the RNR (busy) signal, the sending communication apparatus causes a busy timer to start and after a lapse of a preset time, sends the data information I(1, 0) again to the receiving communication apparatus. Upon reception of the re-transmitted data information I(1, 0), the receiving communication apparatus again checks the number of empty receiver buffers, and if it is larger than the predetermined value, continues to receive the data information I(1, 0) and sends an RR (communication enabled) signal to the sending communication apparatus. On the contrary if the number of empty receiver buffers is still smaller than the predetermined value, the receiving communication apparatus sends again an RNR (busy) signal to the sending communication apparatus to thereafter repeat the above operations. In the meantime, the receiving communication apparatus counts the number of transmissions of RNR (busy) signals, as the transmitter/receiver busy state number.

In operation of the communication control adaptor 69, the self-diagnosis unit 60 performs the self-diagnosis at the time of system reset when the power is turned on at the terminal 30 and the terminal control unit 20. Thereafter, the initial value setting unit 63 determines a transmitter/receiver buffer ratio in accordance with the initial value setting table 74 to thereby subscribe to the communication line. The subscription to the communication line means the state during which data can be fetched by the data reception unit 61 in the terminal 30 and the terminal control unit 20. After completion of subscribing to the communication line, the initial value setting unit 63 instructs the upper layer interface unit 68 to report an initial value setting completion to the upper layer. The upper layer interface unit 68 initiates an interruption of the upper layer for the report of the initial value setting completion. The upper layer receiving the report becomes communication enabled state. During the communication enabled state, data received from the communication line 40 are received by the data reception unit 61 and thereafter passed to the MAC protocol control unit 66 whereat the received data are determined if the data are directed to the receiving communication apparatus or not. If so, the received data are transferred to the receiver buffer management unit 64 and thereafter, sent to the receiver buffer area **78*b* within the LLC protocol control unit 67. The LLC protocol control unit 67 classifies the type of frames such as I, RNR and RR to take them, in the separate order of types, in the statistical information area 75 as statistical information which can be directly accessed even from the upper layer. The LLC protocol control unit 67 then notifies a data reception to the upper layer interface unit. Whether the receiver buffer area 78*b* is busy or not is determined based on the number of empty receiver buffers. For instance, assuming that the total number of transmitter and receiver buffers are 100 and that the numbers of transmitter and receiver buffers are both 50 at the first initial value setting, it is judged busy if the number of empty receiver buffers becomes smaller than a predetermined value, e.g., 10 (i.e., more than 40 buffers are used). The upper layer interface unit issues a data reception interruption and informs the upper layer of such effect. In parallel with the above data flow, the transmitter/receiver buffer dynamic control unit 76 reads the statistical information in the statistical information area 75 at periodical interruptions from the interruption generator timer 77. If the receiver buffer busy state has occurred more than a predetermined value (e.g, 10 times), the transmitter/receiver buffer dynamic control unit 76 searches the transmitter/-receiver buffer ratio correspondence table 80 to find the receiver buffer busy state number 81 most nearest to the counted receiver buffer busy state number. The corresponding receiver buffer length 73 is set as the receiver buffer length 73 in the initial value setting table 74. Referring further to FIG. 2, upon reception of an initial value setting instruction, the initial value setting unit 63 instructs the MAC protocol control unit 66 to remove from the communication line to conduct hardware initial value setting. As the communication control adapter 69 removes from the communication line, the MAC protocol control unit 66 reports the removal completion to the initial value setting unit 63. After removal from the communication line, the system becomes communication disabled state. Upon reception of a signal indicating the removal completion from the communication line, re-initializing of necessary buffer lengths is carried out in accordance with the initial value setting table 74. In this case, the receiver buffer length becomes longer than the previous one. For instance, the fifty receiver buffers as assumed above are increased to sixty receiver buffers. In this embodiment, since the total number of transmitter and receiver buffers is constant, the border 78*c* between the buffer areas 78*a* and 78*b* shifts to the transmitter buffer area 78*a***. After the above initial value setting is finished, subscription to the communication line is again effected. After completion of subscribing to the communication line, the initial value setting completion is notified to the upper layer via the upper layer interface unit to thus become communication enabled state.

According to the above operation, the capacity of receiver buffer is made larger upon occurrences of receiver buffer busy states, so that the occurrence of receiver buffer busy state can be made smaller and hence the communication performance is maintained not degraded. Namely, in the sequence shown in FIG. 6, the number n of repetitions of the operation from RNR (1) to I(1, 0) can be decreased.

In the above embodiment, the transmitter buffer area, receiver buffer area and two tables (including the initial value setting table 74 and transmitter/receiver buffer ratio correspondence table 80) have been formed respectively on different RAMs. However, they may be formed on a single RAM.

As appreciated from the foregoing detailed description of the embodiment of the buffer management system of this invention, when the receiver buffer busy state number read out at regular intervals becomes in excess of a predetermined value, the transmitter/-receiver buffer ratio is changed such that the size of the receiver buffer area becomes larger. Therefore. even if the data traffic increases, the occurrence of receiver buffer busy states can be reduced without limiting the traffic, to advantageously prevent the communication performance from being degraded.

What is claimed is:

1. A buffer management system for a communication apparatus having a plurality of transmitter buffers and a plurality of receiver buffers, comprising:

- a transmitter/receiver buffer having a transmitter buffer area and a receiver buffer area, said transmitter buffer area and said receiver buffer area corresponding to said plurality of transmitter and receiver buffers, respectively, and the ratio of said transmitter buffer area to said receiver buffer area being alterable;
- means for transmitting data loaded in said transmitter buffer area;
- means for loading received data in said receiver buffer area;
- means for counting a number of occurrences of busy state of said receiver buffer area during a predetermined time duration; and
- control means for dynamically changing said ratio of said transmitter buffer area to said receiver buffer area respectively of said transmitter/receiver buffer, in accordance with said counted buffer busy number.

2. A buffer management system according to claim 1, wherein said communication apparatus having transmitter and receiver buffers has a protocol control unit connected to said means for transmitting and said means for loading for performing data transfer control and flow control.

3. A buffer management system according to claim 1, wherein it is judged the occurrences of busy state when the number of empty receiver buffers becomes smaller than a predetermined value.

4. A buffer management system according to claim 2, wherein in said protocol control unit for performing data transfer control and flow control, a statistical information area is provided for storing the number of the occurrences of busy state of said receiver buffer, and said statistical information is read at regular time intervals.

5. A buffer management system according to claim 3, wherein said dynamic control means has a transmitter/-receiver buffer correspondence table which determines an optimum ratio of said transmitter/receiver buffer for each of said buffer busy state number.

6. A buffer management system according to claim 5, wherein in said protocol control unit for performing data transfer control and flow control, an initial value setting table is provided, whereby said optimum ratio of said transmitter/receiver buffer set in said transmitter/-receiver buffer correspondence table is set in said initial value setting table, and a ratio in size of said transmitter buffer area to said receiver buffer area is determined based on the set value in said initial value setting table.

7. A buffer management system according to one of claim 3, 4, 5 or 6, wherein when data from another communication apparatus is received, the number of empty receiver buffers is checked by said control means, and if it is smaller than a predetermined value a Receive Not Ready signal is sent to said other communication apparatus and the number of occurrences of said Receive Not Ready signals sent to said other communication apparatus is counted by said means for counting and said counted number of Receive Not Ready signals is used as the number of occurrences of busy state of said receiver buffer.

8. A buffer management system according to claim 1, wherein a ratio in size of said transmitter buffer area to said receiver buffer area initially set is determined such that a transmitter buffer area/receiver buffer area is 50/50.

9. A buffer management system according to claim 1, wherein a ratio in size of said transmitter buffer area to said receiver buffer area initially set is determined such that a transmitter buffer area/receiver buffer area is 40/60.

10. A buffer management system according to claim 6, wherein said initial value setting table is formed on a RAM.

11. A buffer management system according to claim 5, wherein said transmitter/receiver buffer correspondence table is formed on a RAM.

12. A buffer management system according to claim 1, wherein said transmitter buffer area and said receiver buffer area are formed on a RAM.

13. A buffer management system according to claim 12, wherein said transmitter buffer area, said receiver buffer area, said initial value setting table and said transmitter/receiver buffer correspondence table are formed on the same RAM.

14. A buffer management method in a communication system wherein communication is made via a transmitter/receiver buffer, said transmitter/receiver buffer having a transmitter buffer area with a plurality of transmitter buffers and a receiver buffer area with a plurality of receiver buffers, data being transmitted from said transmitter buffer area and received in said receiver buffer area, comprising the steps of:

counting the number of occurrences of busy state of said receiver buffer area during a predetermined time duration; and dynamically controlling a ratio of said transmitter buffer area to said receiver buffer area respectively of said transmitter/receiver buffer, in accordance with the counted busy state number.

* * * * *